United States Patent [19]
Hungerford, Jr.

[11] Patent Number: 5,624,217
[45] Date of Patent: Apr. 29, 1997

[54] CONNECTOR FOR FACILITATING A CONNECTION BETWEEN A CHANNEL MEMBER AND A SUPPORT MEMBER

[76] Inventor: Charles S. Hungerford, Jr., 135 East Ave., New Canaan, Conn. 06840

[21] Appl. No.: 580,939

[22] Filed: Dec. 29, 1995

[51] Int. Cl.$^6$ ............................ F16B 21/00; F16B 37/04; F16L 3/24
[52] U.S. Cl. ................. 411/85; 411/84; 411/104; 248/72
[58] Field of Search .................... 411/84, 85, 104; 248/58, 68.1, 72, 74.1, 74.2, 316.5; 24/339; 403/344

[56] References Cited

U.S. PATENT DOCUMENTS

| | | | |
|---|---|---|---|
| 3,741,603 | 6/1973 | McLean, Jr. ........................... | 411/93 |
| 4,545,697 | 10/1985 | Verdenne et al. ..................... | 411/85 |
| 4,662,590 | 5/1987 | Hungerford, Jr. ..................... | 248/72 |
| 5,209,619 | 5/1993 | Rinderer ................................ | 411/85 |
| 5,375,798 | 12/1994 | Hungerford, Jr. ..................... | 411/104 |

Primary Examiner—Steven N. Meyers
Assistant Examiner—Robert G. Santos
Attorney, Agent, or Firm—Bachman & LaPointe, P.C.

[57] ABSTRACT

A connector comprises first and second opposed, spaced apart locking lugs having first and second opposed, spaced apart faces between which the channel member is clamped. A flexible connection integral with the opposed faces of the locking lugs joins the locking lugs together in a unitary structure in a manner which allows for the space between the opposed faces of the locking lugs to be varied. The first and second locking lugs are provided with axially aligned bores which, when securing the connector to the channel member, receive a fastener for drawing the opposed faces of the locking lugs toward one another when the fastener is advanced into the axially aligned bores for clamping the channel member in between the opposed locking lugs of the connector. The first locking lug comprises the improvement comprising said first locking lug comprises a substantially rectangular corrugated body having a plurality of corrugations each having a top surface and a bottom surface, said corrugated body having terminal ends wherein the terminal ends extend toward the second locking lug a distance d below a plane formed by the bottom surfaces of the corrugations.

12 Claims, 2 Drawing Sheets

CONNECTOR FOR FACILITATING A CONNECTION BETWEEN A CHANNEL MEMBER AND A SUPPORT MEMBER

BACKGROUND OF THE INVENTION

The present invention relates to connector devices and, more particularly, to connector devices useful for facilitating a connection between a structural channel member and a support member.

It is well known in the prior art to support pipes, cables and the like from construction channel members by means of a support member secured to the channel by a connector device. A particularly useful connector device is disclosed in Applicant's previously issued U.S. Pat. No. 5,375,798 issued Dec. 27, 1994. The connector device disclosed in U.S. Pat. No. 5,375,798 is particularly useful for supporting a pipe clamps of the type disclosed in U.S. Pat. Nos. 4,291,855 and 4,955,574 from a structural channel member.

Construction channel members of the type disclosed in the aforementioned patents are manufactured in various sizes, shapes and materials. The connector device disclosed in U.S. Pat. No. 5,375,798 is particularly useful in combination with channel members formed of metal material. Changes in fire codes have required a connector which exhibits increased strength with a secure grip to the channel.

Naturally, it would be highly desirable to provide a connector device for facilitating a connection between a channel member and a support member which is readily usable under any current fire code and useful with any type of construction member regardless of the material from which the channel member is made.

Accordingly, it is the principal object of the present invention to provide a connector device for facilitating a connection between a channel member and a support member.

It is a particular object of the present invention to provide a connector as aforesaid which is usable with channel members formed of various materials and configurations.

It is a further object of the present invention to provide a connector as aforesaid which exhibits excellent strength and gripping ability.

Further objects and advantages of the present invention will become clear hereinbelow.

SUMMARY OF THE INVENTION

In accordance with the present invention the foregoing objects and advantages are readily obtained.

The present invention is drawn to a connector comprises first and second opposed, spaced apart locking lugs having first and second opposed, spaced apart faces between which the channel member is clamped. A flexible connection integral with the opposed faces of the locking lugs joins the locking lugs together in a unitary structure in a manner which allows for the space between the opposed faces of the locking lugs to be varied. The first and second locking lugs are provided with axially aligned bores which, when securing the connector to the channel member, receive a fastener for drawing the opposed faces of the locking lugs toward one another when the fastener is advanced into the axially aligned bores for clamping the channel member in between the opposed locking lugs of the connector. The first locking lug comprises a substantially rectangular corrugated body having a plurality of corrugations each having a top surface and a bottom surface, said corrugated body having terminal ends wherein the terminal ends extend toward the second locking lug a distance d below a plane formed by the bottom surfaces of the corrugations.

In accordance with a further feature of the present invention, the second locking lug is formed as a substantially U-shaped channel having two substantially parallel sidewalls connected by a base portion, each of the sidewalls having a free end which extends toward the corrugated body. In accordance with a further feature of the present invention one end of each of the flexible straps is secured to said base portion. In the preferred embodiment each of the flexible straps comprises a first and a second substantially straight portion connected together to form an angle α of less than 150%. Furthermore, the corrugated body has a thickness t and wherein the distance d is less than the thickness t.

By providing a connector as set forth above, the load bearing strength and gripping ability is increased and the connector of the present invention is suitable for use with channel members formed of any desired material and configuration.

Other features and advantages of the present invention will become more apparent from an examination of the following specification when read in conjunction with the drawings.

DETAILED DESCRIPTION

Referring to the figures, the connector of the present invention will be disclosed in detail.

Figure 2:
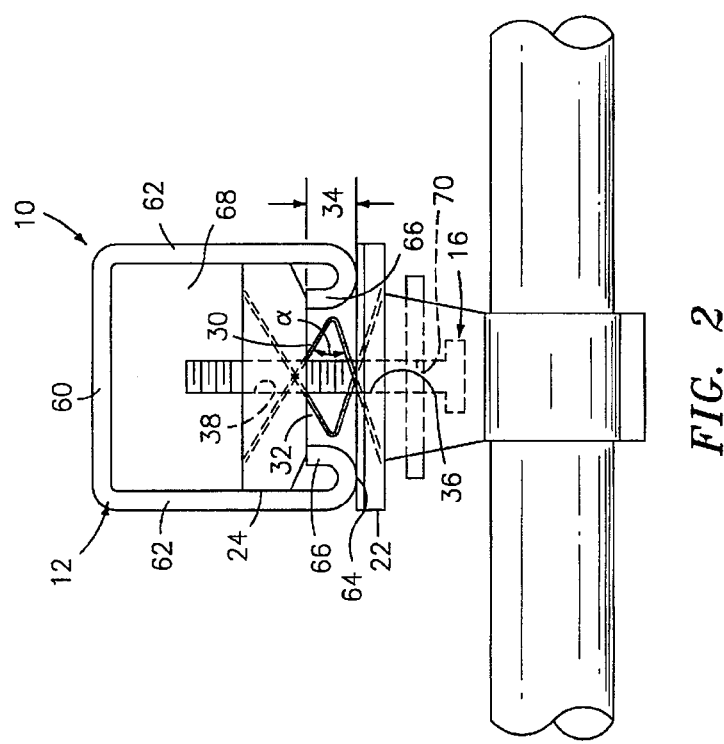
FIG. 2 is a side view showing the connector device of the present invention assembled to a channel member and supporting a support member of the type disclosed in U.S. Pat. Nos. 4,291,855 and 4,955,574.
Figure 3:
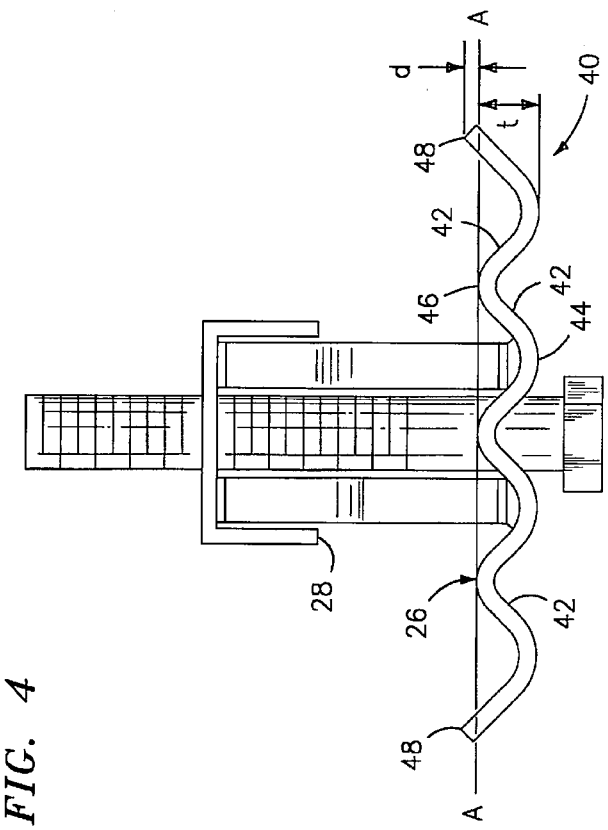
FIG. 3 is a magnified end view of the connector.

With reference to the drawings, FIG. 2 illustrates a structural assembly 10 comprising in combination a channel member 12, a support member 14 and a connector 20 for connecting the support member 14 to the channel member 12 by means of a fastener 16.

Figure 1:
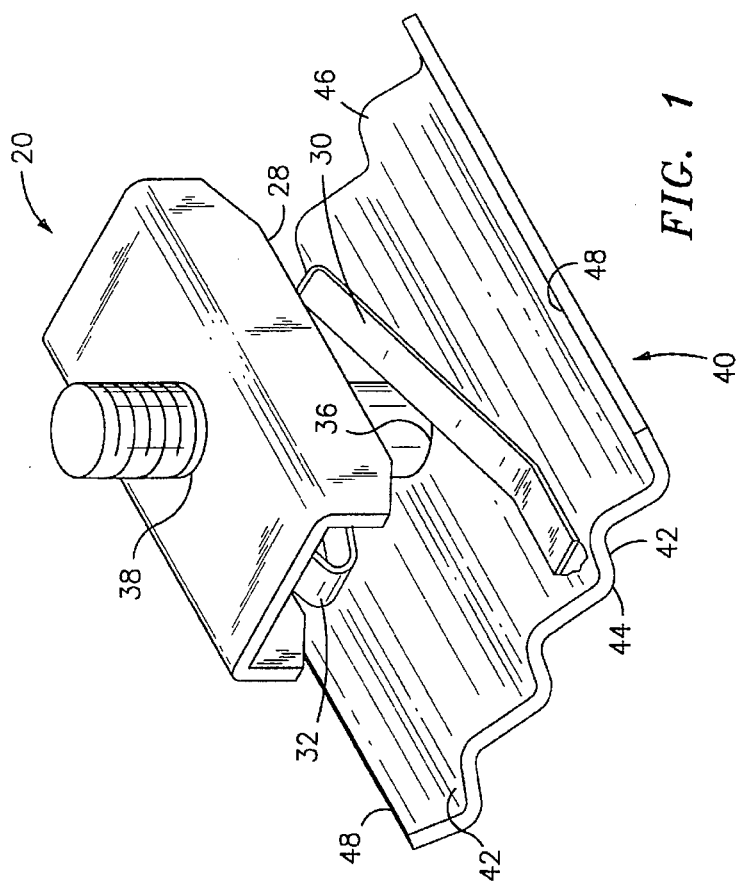
FIG. 1 is a perspective view of the connector device in accordance with the present invention.
Figure 4:
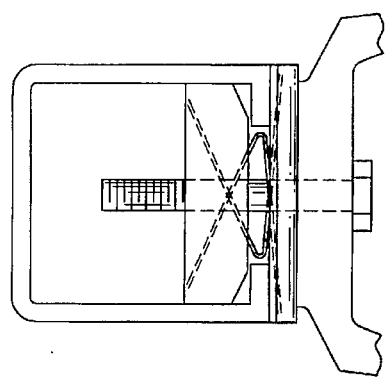
FIG. 4 is a view similar to FIG. 2 illustrating the connector with a European type channel member.

With reference to FIG. 1, the connector 20 comprises first and second opposed, spaced apart locking lugs 22 and 24 having first and second spaced apart faces 26 and 28 respectively. As shown in FIG. 1, the first and second opposed locking lugs 22 and 24 are joined together by means of flexible straps 30 and 32 which are formed integral with the opposed locking lugs so as to form together therewith a unitary structure having a space between the opposed faces 26 and 28 of the locking lugs 22 and 24, respectively. Alternatively, the straps may be formed separately and attached by brazing or the like. In accordance with the present invention, the connector is a unitary single piece formed of metal wherein the straps 30 and 32 are flexible so as to allow for the space 34 between the locking lugs 22 and 24 to be varied in manner to be described hereinbelow. Each of the locking lugs 22 and 24 are provided with a bore 36 and 38 lying along a common axis. In accordance with the present invention the locking lug 24 which is adapted to be received within a channel member (to be described hereinbelow) is provided with a threaded bore 36 for receiving the fastening member 16 in a manner to be described. In accordance with the present invention the straps 30 and 32 are opposed to each other and are disposed on either side of the axis defined by the axially aligned bores 36 and 38 provided in the locking lugs 22 and 24. Locking lug 22 comprises a substantially rectangular corrugated body 40 having a plurality of corrugations 42 having top surface 44 and bottom surface 46 which define a thickness t. Terminal ends 48 extend toward locking lug 24 and extend a distance d below a plane x formed by the bottom surfaces 46 of the corrugations 42. The distance d is less than the thickness t and preferably, d≦0.25 t. The terminal ends 48 are shaped so as to cut into the return bend portion 64 of the channel so as to securely grip the channel as will be described below. With reference to FIG. 4, the connector 20 is usable with any variety of shaped channel including typical European channels which do not have a return bend.

The locking lug 24 is formed of a substantially U-shaped channel having two substantially parallel sidewalls 50 connected by a base portion 52. The free ends 54 of the sidewall 50 extend toward the corrugated body 40. Straps 30 and 32 each comprise first and second substantially straight portions 54, 56 connected together to form an angle α therebetween which is less than 150°. The angle α decreases as the lugs 22 and 24 are drawn toward each other as described below. One end of each strap 30 and 32 is connected to corrugated body 40 and the other end is connected to base portion 52.

Figure 5:
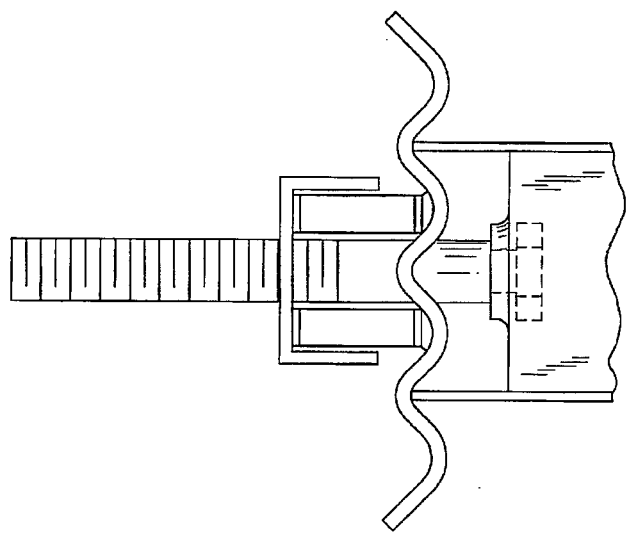
FIG. 5 is an end view showing the base of a support member fixed in the corrugations when assembled.

With reference to FIG. 2, the assembly of the connector 20 with the channel member 12 and support member 14 will be described. The channel member 12 comprises a top wall 60 having a pair of continuous contiguous sidewalls 62. Each sidewall 62 is provided with a return bend portion 64 and a termination end portion 66 which lies within the channel space 68 defined by sidewalls 62 and top wall 60. The support member 14 is provided with a through bore 70 having an axis extending from one surface thereof to a second surface thereof. In the case of the support member schematically shown in FIG. 2, a suitable support member 14 is of the type disclosed in U.S. Pat. No. 4,291,855. FIG. 5 illustrates how the flanges 80 of the base of the support member 14 is held in corrugations 42.

In order to facilitate a connection between channel member 12 and support member 14, the locking lug 24 of the connector 20 is located within the space 68 of the channel member 12 such that the sidewalls 50 of the locking lug 24 lie on the end portions 66 of the sidewalls 62. The flexible strips 30 and 32 lie in a space defined by the turned up sidewall portions 72. Fastener 16 is received in through bore 70 of the support member 14 and axial bores 36 and 38 of the locking lugs 22 and 24 of the connector 20. The fastener 16 is threaded so as to be threaded into the threaded bore 36 provided in locking lug 24. As the fastener is advanced into the threaded bore 36 of locking lug 24 the locking lugs 22 and 24 are drawn together for clamping the channel member between the opposed faces 26 and 28 thereof, thereby securing the connector and correspondingly the support member 14 to the channel member 12. Terminal ends 48 cut into return bend portion 64 to help secure the connector to the channel. Thus, the connector of the present invention is suitable for use with channel members formed of any type of material including metal, plastic and the like and/or various configurations.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A connector for facilitating a connection between a channel member and a support member, said connector having first and second opposed, spaced apart locking lugs having first and second opposed, spaced apart faces, respectively, flexible means integral with said opposed faces of said locking lugs for joining said locking lugs together in a unitary structure such that the space between the opposed faces of said locking lugs may be varied; and axially aligned bore means for receiving a fastener provided in said first and second locking lugs, the improvement comprising said first locking lug comprises a substantially rectangular corrugated body having a plurality of corrugations each having a top surface and a bottom surface, said corrugated body having terminal ends wherein the terminal ends extend toward the second locking lug a distance d below a plane formed by the bottom surfaces of the corrugations.

2. A connector according to claim 1 wherein said second locking lug is formed as a substantially U-shaped channel having two substantially parallel sidewalls connected by a base portion, each of the sidewalls having a free end which extends toward said corrugated body.

3. A connector according to claim 2 wherein said flexible means comprises first and second opposed flexible straps disposed on either side of an axis defined by said axially aligned bore means.

4. A connector according to claim 3 wherein one end of each of said flexible straps is secured to said base portion.

5. A connector according to claim 3 wherein each of said flexible straps comprises a first and a second substantially straight portion connected together to form an angle α of less than 150%.

6. A connector according to claim 1 wherein the corrugated body has a thickness t and wherein the distance d is less than the thickness t.

7. A connector according to claim 1 wherein d≦0.25 t.

8. A connector according to claim 1 wherein one of said axially aligned bore means for receiving a fastener is threaded.

9. In combination, a channel member, a connector for facilitating a connection between the channel member and a support member, and a fastener for locking said connector to said channel member; said channel member comprises a top wall contiguous with two sidewalls, each sidewall having a termination end portion; said connector comprises first and second opposed, spaced apart locking lugs having first and second opposed, spaced apart faces, flexible means integral with said opposed face of said locking lugs for joining said locking lugs together in a unitary structure such that the space between the opposed faces of said locking lugs may be varied, and axially aligned bore means for receiving a fastener provided in said first and second locking lugs, the improvement comprising said first locking lug comprises a substantially rectangular corrugated body having a plurality of corrugations each having a top surface and a bottom surface, said corrugated body having terminal ends wherein the terminal ends extend toward the second locking lug a distance d below a plane formed by the bottom surfaces of the corrugations; and said fastener comprises means received within said axially aligned bore means for receiving a fastener for drawing said opposed faces of said locking lugs toward one another wherein said second opposed locking lug lies on said end portion of each sidewall and said first opposed locking lug lies on said termination end portion for clamping said channel member between said opposed faces wherein the terminal ends contact said return bend portion.

10. The combination of claim 9 wherein said second locking lug is formed as a substantially U-shaped channel having two substantially parallel sidewalls connected by a base portion, each of the sidewalls having a free end which extends toward said corrugated body.

11. The combination of claim 9 wherein said flexible means comprises a first and a second substantially straight portion connected together to form an angle $\alpha$ of less than 150%.

12. The combination of claim 10 wherein $d \leq 0.25$ t.

* * * * *